United States Patent [19]

Dworak et al.

[11] Patent Number: 4,522,171
[45] Date of Patent: Jun. 11, 1985

[54] PRE-COMBUSTION OR TURBULENCE CHAMBER FOR INTERNAL COMBUSTION ENGINES

[75] Inventors: Ulf Dworak, Baltmannsweiler; Hans Olapinski, Aichwald; Dieter Fingerle, Hochdorf; Ulrich Krohn, Leonberg, all of Fed. Rep. of Germany

[73] Assignee: Feldmühle Aktiengesellschaft, Dusseldorf, Fed. Rep. of Germany

[21] Appl. No.: 505,072

[22] Filed: Jun. 16, 1983

[30] Foreign Application Priority Data

Jun. 18, 1982 [DE] Fed. Rep. of Germany ....... 3222815
Jan. 29, 1983 [DE] Fed. Rep. of Germany ....... 3303048

[51] Int. Cl.³ .................................................. F02B 3/00
[52] U.S. Cl. ...................................... 123/270; 123/254
[58] Field of Search ............... 123/270, 254, 271, 272, 123/275, 255

[56] References Cited

U.S. PATENT DOCUMENTS

| | | | |
|---|---|---|---|
| 1,798,260 | 3/1931 | Hehr | 123/270 |
| 1,874,994 | 8/1932 | Hehr | 123/270 |
| 2,969,050 | 1/1961 | Greier et al. | 123/270 |
| 3,398,726 | 8/1968 | Bricout | 123/254 |
| 3,730,163 | 5/1973 | Elsbett et al. | 123/270 |
| 3,954,093 | 5/1976 | Hughes | 123/254 |
| 4,300,497 | 11/1981 | Webber | 123/254 |
| 4,325,334 | 4/1982 | Nishida et al. | 123/270 |
| 4,327,681 | 5/1982 | Latsch et al. | 123/254 |
| 4,442,807 | 4/1984 | Latsch et al. | 123/254 |

Primary Examiner—Raymond A. Nelli
Attorney, Agent, or Firm—Toren, McGeady and Stanger

[57] ABSTRACT

In a pre-combustion or turbulence chamber for an internal combustion engine, an inner molded body, defining an inner chamber, is formed of a material having a thermal conductivity of at least 12 W/(m·K). An outer body is secured to the outer surface of the inner body by shrinking or glueing. The outer body is formed of a thermally insulating ceramic material having a thermal conductivity of less than 10 W/(m·K). Due to the low thermal conductivity of the outer molded body, the inner molded body is insulated against heat losses. The higher thermal conductivity of the inner molded body has the effect that, in the interior of the pre-combustion or turbulence chamber, the point at which the cold fuel jet impinges during the injection process is only slightly cooled.

14 Claims, 4 Drawing Figures

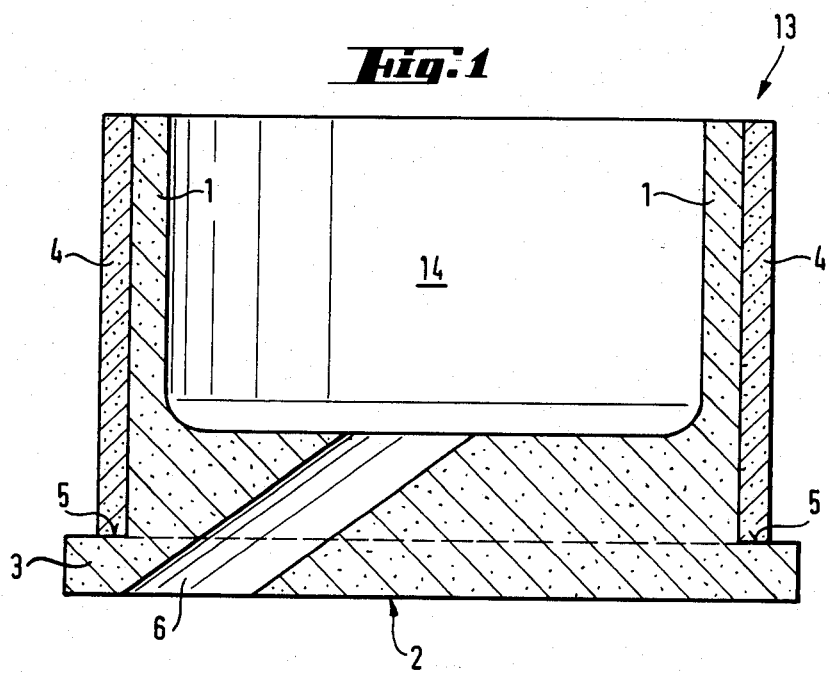
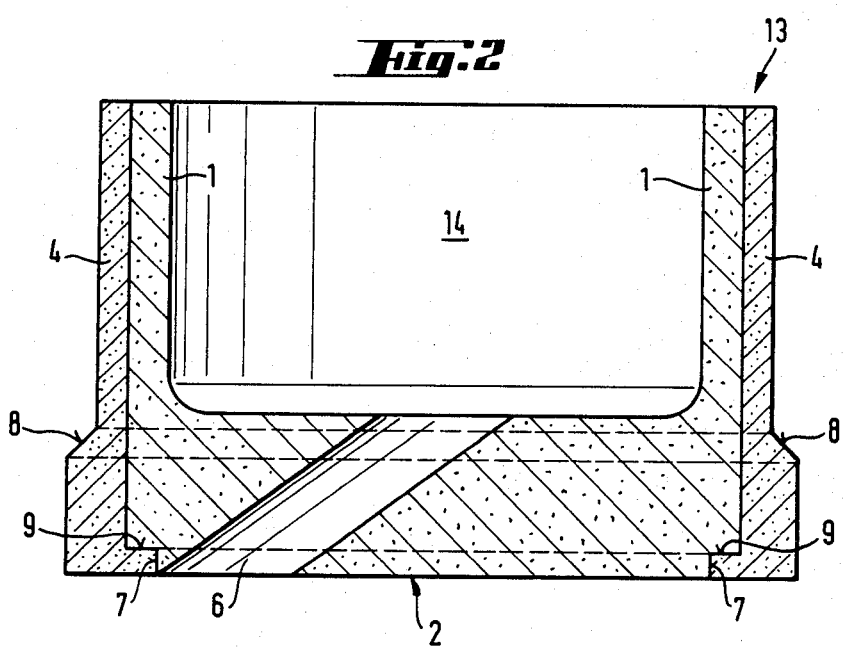

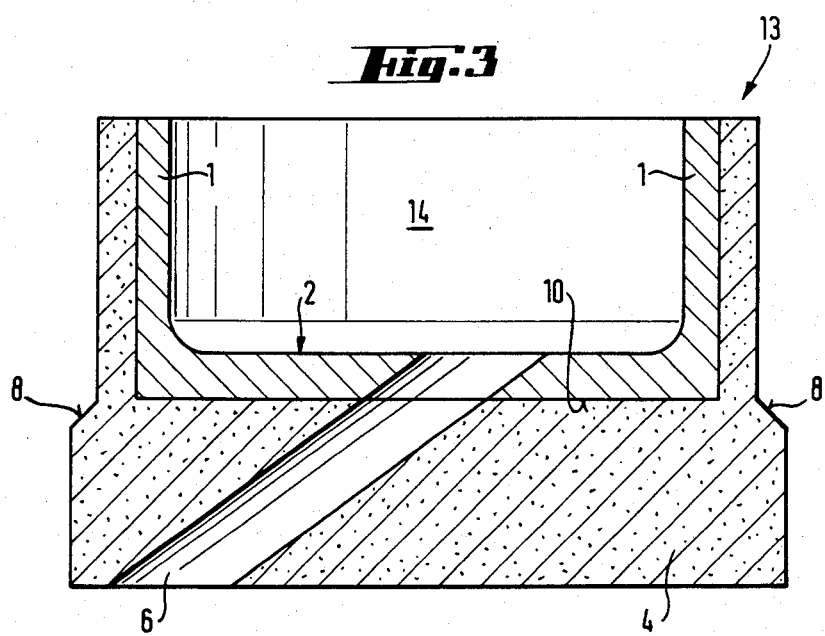
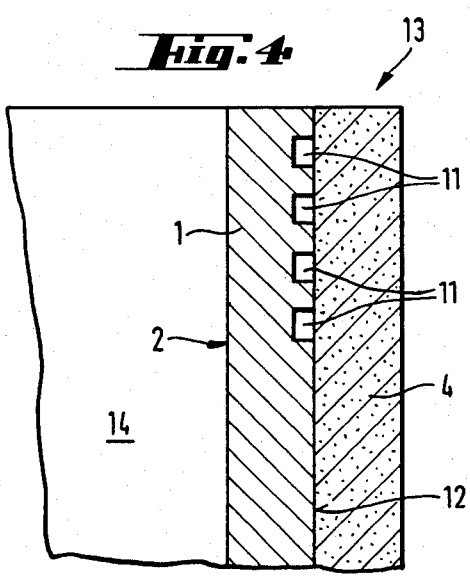

PRE-COMBUSTION OR TURBULENCE CHAMBER FOR INTERNAL COMBUSTION ENGINES

SUMMARY OF THE INVENTION

The invention is directed to a pre-combustion or turbulence chamber manufactured using a ceramic material and to the method of producing the chamber.

Turbulence chambers or pre-combustion chambers have, in some respects, similar functions, accordingly, the term turbulence chamber is used exclusively throughout the following description. It should be noted, however, that the invention is not limited to turbulence chambers but also includes pre-combustion chambers.

Very high demands are made on turbulence chambers and such demands are contradictory in part. In addition to good mechanical strength, turbulence chambers should have dimensional stability even at high temperatures and they should be resistant to corrosion and erosion. In the development of engines with improved efficiency, it has been necessary to insulate the turbulence chamber from the engine parts located more remote from the combustion chamber, so that heat losses are kept as low as possible and an improved combustion of the fuel is achieved due to the higher temperatures present in the turbulence chamber. In diesel engines, the well insulated turbulence chamber is additionally expected to provide a shorter pre-heating time and an improved cold-starting behavior.

The turbulence chambers used in the past have certain disadvantages and have not been able to meet all of the demands made on them. Turbulence chambers formed of high temperature resistant steels or alloys, such as steel with the addition of nickel, have a relatively low thermal conductivity, however, the insulating effect is still not considered sufficient.

In the published Japanese Patent Application No. 52-131010, a turbulence chamber is disclosed with side walls partially provided with a thermally insulating cover. In such an arrangement, the thermally insulating material is located in an annular groove provided in the side walls whereby a portion of the side walls and the entire bottom of the turbulence chamber are not thermally insulated and a relatively large amount of heat is lost to the adjacent engine parts. Another disadvantage exists due to the known difficulties resulting from the varying thermal expansion characteristics of different materials.

In the German Pat. Nos. 86 41 73 and 87 55 90, a sheathing for a turbulence chamber is provided with a thermally insulating layer and the chamber is cast in the cylinder head. In these known arrangements, proposed coatings of graphite or ceramic materials containing a binder have the disadvantage which occur when metal parts, coated with ceramic materials, are exposed to thermal conditions. Due to different thermal expansion coefficients of metal and ceramics, cracks form within the ceramic coating and, as a result, the thermally insulating layer chips off.

In German Offenlegungsschrift No. 28 04 562 a turbulence chamber is disclosed consisting of a two-part metal chamber as the carrier for a ceramic coating, and this chamber has the above-known disadvantages. Since the actual combustion chamber in this turbulence chamber is formed by another coating of a catalytic material, such as, platinum or rhodium, applied on the ceramic lining, the above-mentioned danger of chipping at the metal/ceramic interface in this turbulence chamber is two-fold. Another disadvantage resides in the complicated manufacture of the turbulence chamber, because initially the two parts of the metal chamber must be produced, the ceramic lining placed on these parts and the lining must be prepared to receive the catalytic layer applied to its surface.

German Offenlegungsschrift No. 30 28 440 sets forth a turbulence chamber constructed solely of ceramic material with a shell-like, sintered inner wall formed of silicon carbide. This known turbulence chamber permits the use of less expensive starting materials than the known high-temperature resistant steels or alloys and, in addition, has an excellent resistance to erosion and corrosion, however, the insulating effect of silicon carbide is very low due to its good thermal conductivity, with the result that substantial heat losses occur with a low utilization of fuel.

Therefore, it is the primary object of the present invention to avoid the disadvantages experienced in the past and to provide a turbulence chamber which, in addition to the required characteristics, such as, good mechanical strength, particularly under thermal load, resistance to erosion and corrosion, and high-temperature resistance, has a good insulation action and a good heat conductivity on its inner surface and, as a consequence, permits only insignificant local cooling at the impact point of the fuel jet. Accordingly, the purpose of the present invention is to facilitate better fuel utilization and, in the case of diesel engines, a better cold-starting behavior.

In accordance with the present invention, a pre-combustion or turbulence chamber for an internal combustion engine is provided where the side walls and possibly the bottom of the inner chamber are provided with a good thermal insulating effect by the use of a ceramic material while the inner space or chamber is defined by a material having a good thermal conductivity. Moreover, the pre-combustion or turbulence chamber is characterized in that the chamber is made up of an inner molded body forming the inner space or chamber and an outer molded body providing the thermal insulation. The outer molded body is secured to the inner molded body by glueing or shrinking. The outer molded body encloses or surrounds the inner molded body at least at its side walls. The inner molded body is formed of a material having a thermal conductivity of at least 12 W/(m·K) and the outer molded body is formed of a ceramic material having a thermal conductivity of less than 10 W/(m·K).

Based on the present invention, the turbulence chamber has the advantage initially in that the low thermal conductivity of the outer molded body providing the thermal insulation affords a significant insulation of the inner thermal body and, therefore, the heat loss from the temperature prevailing in the interior of the turbulence chamber is substantially reduced. Another advantage is that, due to the high thermal conductivity of the inner molded body, the point where the cold fuel jet impinges on the surface of the chamber is only slightly cooled, because the high thermal conductivity of the inner body leads to a substantial temperature equalization on the inner surface of the chamber.

The term thermal conductivity as used in the specification and claims means the thermal conductivity at room temperature.

While utilizing the operation of constructing the thermal insulation and the member forming the inner chamber of the turbulence chamber from separate molded bodies which can be assembled one into the other, such as by securing the molded body together by glueing or shrink-fitting, the significant advantage of the present invention is that it avoids the disadvantages known in prior turbulence chambers where the thermal expansion coefficients of metal and ceramic materials are not compatible when metallic structural components are used as carriers for a ceramic coating.

Various embodiments of the turbulence chamber, according to the present invention, are possible with respect to the thermal insulation of the inner molded body. In a preferred embodiment, where only the side walls of the inner molded body are surrounded by an outer molded body of a ceramic material, the outer molded body is supported on a shoulder formed on the base or bottom of the inner molded body.

To ensure a particularly secure seat or engagement of the inner and outer molded bodies, in another preferred embodiment the bottom of the inner molded body is stepped and bears on internal shoulders on the outer molded body.

In a particularly preferred embodiment, the side walls and bottom of the inner molded body are enclosed by an outer molded body formed of thermal insulation. Such an arrangement ensures not only a secure connection between the two but also a strong insulating effect.

In another preferred embodiment, the turbulence chamber formed in accordance with the present invention is characterized in that the outer molded body is formed of a ceramic material having a thermal conductivity of less than 3 W/(m·K) and that the inner molded body is made of a material having a thermal conductivity greater than 50 W/(m·K).

In still another preferred embodiment, the inner molded body is made of a high temperature alloy containing 57 to 75% by weight nickel, up to 20% by weight chromium, between 0 and 18% by weight cobalt, up to 1.5% by weight aluminum and up to 2.4% by weight titanium so that the respective portions add up to 100% by weight.

Due to their increased resistance to erosion and corrosion, however, ceramic materials are particularly preferred. Sintered aluminum oxide with a thermal conductivity of at least 25 W/(m·K) is especially suitable.

For the inner molded body, however, it is preferable if sintered silicon carbide is used which has a thermal conductivity of greater than 50 W/(m·K). Silicon carbide combines the features of maximum erosion and corrosion resistance with a high resistance to thermal shock and a thermal conductivity which is excellent for purposes of the invention.

In accordance with the present invention, it is preferred if the outer molded body of the turbulence chamber is formed of sintered aluminum titanate. The use of such material affords the possibility of directly casting the turbulence chamber embodying the present invention into the cylinder head formed of cast aluminum or gray cast iron, so that the turbulence chamber is securely seated in the cylinder head after the cast has cooled.

Due to its higher mechanical strength, sintered zirconium oxide is especially preferred for forming the outer molded body because its insulating effect is quite good and, due to its high strength, it provides the possibility of fitting the turbulence chamber into the cylinder head in a tight sliding fit. For purposes of the invention, either fully stabilized zirconium oxide as well as partially stabilized zirconium oxide are suitable and it has been found to be particularly advantageous to use fully stablized zirconium oxide if the inner molded body is to be connected to the outer molded body by a glueing operation, while partially stabilized zirconium oxide is preferred if the inner molded body is to be secured by a shrink fit with the outer molded body. Zirconium oxide with a breaking strength of greater than 300 N/mm$^2$ is particularly suitable.

A particularly suitable embodiment of the present invention involves the combination of the inner molded body formed of silicon carbide and the outer molded body formed of partially stabilized zirconium oxide for constructing the turbulence chamber. In such a turbulence chamber, the excellent insulating effect of zirconium oxide is combined with the high heat conductivity of silicon carbide. Compared to known turbulence chambers formed of high-temperature resistance steel, the insulating effect relative to the other engine parts is up to four times greater. Still another advantage is that, due to the high thermal conductivity of the inner molded body, the temperature in the interior of the turbulence chamber is essentially equalized and, therefore, the utilization of the fuel is improved.

The size of the turbulence chamber constructed in accordance with the present invention, depends essentially upon the construction of the engine in which the turbulence chamber is to be mounted. To achieve an insulating effect which is as high as possible, the wall thickness of the outer molded body should be not less than 1 mm, and preferably, the wall thickness is greater than 2 mm. In a preferred embodiment, the outer surface of the turbulence chamber is formed so that it is smooth and without interruptions so that the inner molded body can be enclosed without any gap between it and the outer molded body. For an improved insulating effect, however, the outer surface of the side walls and the bottom of the inner body can be provided with interruptions, for example, in the form of annular grooves or other recesses. In assembling the turbulence chamber embodying the present invention, a particularly suitable method involves heating the outer molded body to provide a shrunk-on fit so that it can be slid on over the cold inner molded body. After cooling, the inner molded body is securely clamped within the outer molded body. Preferably, the outer circumference of the side walls of the inner molded body are in the range of 0.05 to 0.3%, and preferably 0.1 to 0.2%, greater than the inner circumference of the outer molded body prior to the heating step.

Another preferred possibility for manufacturing the turbulence chamber of the present invention where the outer body is made of zirconium oxide involves the steps of sliding the outer molded body onto the inner molded body which has been cooled to a temperature of below −200° C. If necessary, the outer molded body may also be heated.

In the assembly of a turbulence chamber where the outer molded body is formed of aluminum titanate, the outer molded body is advantageously slipped onto the inner molded body in a snug or close sliding fit. In such an arrangement, the secure engagement of the inner body is obtained by casting the completely assembled turbulence chamber into the cylinder head.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a cross-sectional view of a turbulence chamber embodying the present invention;

FIG. 2 is a cross-sectional view, similar to FIG. 1, illustrating another embodiment of the present invention;

FIG. 3 is a cross-sectional view similar to FIGS. 1 and 2, displaying still another embodiment of the present invention; and FIG. 4 is an enlarged partial sectional view of another embodiment of the side wall of the turbulence chamber incorporating the present invention.

DETAILED DESCRIPTION OF THE INVENTION

With regard to the different embodiments disclosed in the drawing, they are not limited to the described material combinations. Other combinations of material are possible if they meet the requirements for the different thermal conductivities of the inner and outer molded bodies. In the various figures components or parts providing the same function are given the same reference numerals.

FIG. 1 is a sectional view of a turbulence chamber in which an inner molded body 2 is formed of silicon carbide and its side walls 1 are laterally enclosed in closely fitting contact by an outer molded body 4 of zirconium oxide. The outer molded body is a sleeve-like member and its inner surface is in closely fitting contact with the outer surface of the side walls so that there is no gap between the inner molded body 2 and the outer molded body 4. The inner molded body 2 has a base 3 extending outwardly from the outer surface of the side walls 1 so that a shoulder 5 is provided on top of the base. The lower end of the outer molded body 4 rests on the shoulder 5. A passage or transfer opening 6 is located in the base 3 of the inner molded body 2 and extends from the outer surface of the base into the interior 14 of the chamber formed by the inner molded body 2.

Inner molded body 2 and outer molded body 4 are formed by molding and sintering of conventional silicon carbide powder and zirconium oxide powder. Following an appropriate surface treatment by a diamond grain member, the outer surface of the inner molded body is provided with a diameter of 26.13 mm and the inner surface of the outer molded body is provided with a diameter of 26.10 mm. Subsequently, the outer molded body is heated to 400° C. and is slipped on over the inner molded body 2. After cooling takes place, there is a secure shrink-fit contact between the outer molded body and the inner molded body.

In another embodiment, as shown in FIG. 2, a sintered molded body of zirconium oxide forms the outer molded body 4 and it is shrunk onto an inner molded body 2 formed by sintering silicon carbide. The base of the inner molded body 2 has an inset step around its peripheral edge forming a step 7 which engages an internally directed flange or shoulder 9 formed on the lower end of the outer molded body 4. For assembly in the cylinder head, frusto-conically shaped outer shoulders 8 are formed on the outer surface of the outer molded body 4. The manufacture and assembly of the turbulence chamber is carried out as described above with respect to FIG. 1.

The embodiment illustrated in FIG. 3 is especially preferred because the inner molded body 2 is insulated by the outer molded body 4 not only around its side walls 1 but also across its bottom or base 10. In this embodiment, the inner molded body 2 is made of a high temperature alloy known as the material No. 2.4969 manufactured under the trade name NIMONIC by the Wiggins Company, a British firm. The outer molded body is constructed by sintering an aluminum titanate powder. In the assembly of the two bodies, the outer molded body 4 is slipped onto the inner molded body 2 with a snug fit. The assembled turbulence chamber is then cast into a cylinder head of aluminum.

In FIG. 4 a partial view is shown of another advantageous embodiment of the present invention in which annular grooves 11 are formed in the outside surface 12 of the side walls 1 with the grooves opening to and covered by the inside surface of the outer molded body 4. In this arrangement, the grooves 11 provide an increased insulating effect.

While specific embodiments of the invention have been shown and described in detail to illustrate the application of the inventive principles, it will be understood that the invention may be embodied otherwise without departing from such principles.

We claim:

1. Pre-combustion or turbulence chamber for an internal combustion engine, comprising side walls and a bottom wall forming an inner chamber, said side walls and bottom wall are formed of a material having a good thermal conductivity, means for providing thermal insulation for at least said side walls of said inner chamber, wherein the improvement comprises that said side walls and bottom wall are formed by an inner molded body defining the inner chamber, said means comprises an outer molded body providing thermal insulation for said inner molded body, said outer molded body secured to said inner molded body with said inner molded body in closely fitting contact with said outer molded body, said outer molded body enclosing at least said side walls of said inner molded body, said inner molded body is formed of a material having thermal conductivity of at least 12 W/m·K) and selected from one of the group consisting of sintered aluminum oxide, sintered silicon carbide, sintered silicon nitride, a high temperature alloy consisting of 57 to 75% by weight nickel, up to 20% by weight chromium, between 0 and 18% by weight cobalt, up to 1.5% by weight aluminum and up to 2.4% by weight titanium so that all of these components add up to 100% by weight, and said outer molded body is formed of a ceramic material selected from the group consisting of sintered aluminum titanate or sintered zirconium oxide having a thermal conductivity of less than 10 W/m·K).

2. Pre-combustion or turbulence chamber, as set forth in claim 1, wherein said inner molded body having a shoulder extending outwardly from said bottom wall of said inner molded body outwardly beyond the outer surface of said side walls of said inner molded body, and said outer molded body closely encircling the side walls of said inner molded body and resting on said shoulder of said bottom wall.

3. Pre-combustion or turbulence chamber, as set forth in claim 1, wherein said bottom wall of said inner molded body is recessed around the edge thereof forming an inset step, said outer molded body having an inwardly projecting flange at the lower end thereof with said step in the bottom wall of said inner molded body resting on said flange at the lower end of said outer molded body.

4. Pre-combustion or turbulence chamber, as set forth in claim 1, wherein said side walls and said bottom wall of said inner molded body are enclosed by said outer molded body.

5. Pre-combustion or turbulence chamber, as set forth in claim 1, wherein said zirconium oxide is fully stabilized.

6. Pre-combustion or turubulence chamber, as set forth in claim 1, wherein said zirconium oxide is partially stabilized.

7. Pre-combustion or turbulence chamber, as set forth in claim 1, wherein said outer molded body is formed of zirconium oxide having a breaking strength greater than 300 N/mm².

8. Pre-combustion or turbulence chamber, as set forth in claim 1, wherein said inner molded body is formed of silicon carbide and said outer molded body is formed of zirconium oxide.

9. Pre-combustion or turbulence chamber, as set forth in claim 1, wherein the wall thickness of said outer molded body is at least 1 mm.

10. Method of assembling a pre-combustion or turbulence chamber, as set forth in claim 1, including the steps of heating said outer molded body, sliding said heated outer molded body onto said inner molded body in the unheated state and cooling said outer molded body for obtaining a shrinkage fit with said inner molded body.

11. Method, as set forth in claim 1, wherein forming the outer circumference of the side walls of said inner molded body is in the range of 0.05 to 0.3% greater than the inner circumference of said outer molded body.

12. Method, as set forth in claim 1, including the steps of cooling said inner molded body to a temperature of below −200° C. and sliding said outer molded body onto and about said inner molded body and raising the temperature of said inner molded body for effecting a secure engagement between said inner and outer molded bodies.

13. Pre-combustion chamber or turbulence chamber for an internal combustion engine comprising a cylinder head, said side walls and a bottom wall forming an inner chamber in said cylinder head, said side walls and bottom wall are formed of a material having a good thermal conductivity, means for providing thermal insulation for at least said side walls of said inner chamber, wherein the improvement comprises that said side walls and bottom wall are formed by an inner molded body defining the inner chamber, said means comprises an outer molded body providing thermal insulation for said inner molded body, said outer molded body secured to said inner molded body with said inner molded body in closely fitting contact with said outer molded body, said outer molded body enclosing at least said side walls of said inner molded body, said inner molded body is formed of a material having thermal conductivity of at least 12 W/(m·K) and selected from one of the group consisting of sintered aluminum oxide, sintered silicon carbide, sintered silicon nitride, a high temperature alloy consisting of 57 to 75% by weight nickel, up to 20% by weight chromium, between 0 and 18% by weight cobalt, up to 1.5% by weight aluminum and up to 2.4% by weight titanium so that all of these components add up to 100% by weight, and said outer molded body consists of sintered zirconium oxide and forms a sliding fit in closely fitting contact with said cylinder head.

14. A pre-combustion chamber or turbulence chamber for an internal combustion engine comprising a cylinder head, said side walls and a bottom wall forming an inner chamber in said cylinder head, said side walls and bottom walls are formed of a material having a good thermal conductivity, means for providing thermal insulation for at least said side walls of said inner chamber, wherein the improvement comprises that said side walls and bottom walls are formed by an inner molded body defining the inner chamber, said means comprises an outer molded body providing thermal insulation for said inner molded body, said outer molded body secured to said inner molded body with said inner molded body in closely fitting contact with said outer molded body, said outer molded body enclosing at least said side walls of said inner molded body, said inner molded body is formed of a material having thermal conductivity of at least 12 W/(m·K) and selected from one of the group consisting of sintered aluminum oxide, sintered silicon carbide, sintered silicon nitride, a high temperature alloy consisting of 57 to 75% by weight nickel, up to 20 by weight chronium, between 0 and 18% by weight cobalt, up to 1.5% by weight aluminum and up to 2.4% by weight titanium so that all of these components add up to 100% by weight, and said outer molded body consists of a molded body of sintered aluminum titanate and the combination of said inner molded body and outer molded body is cast within said cylinder head.

* * * * *